United States Patent
Cox et al.

(10) Patent No.: US 9,394,059 B2
(45) Date of Patent: Jul. 19, 2016

(54) METHOD FOR MONITORING AUTONOMOUS ACCELERATED AIRCRAFT PUSHBACK

(71) Applicant: Borealis Technical Limited, North Plains, OR (US)

(72) Inventors: Isaiah W. Cox, London (GB); Jan Vana, Prague (CZ); Joseph J. Cox, Portland, OR (US); Stefan Kracht, Pullach (DE)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 14/460,299

(22) Filed: Aug. 14, 2014

(65) Prior Publication Data

US 2015/0051757 A1  Feb. 19, 2015
US 2015/0175271 A2  Jun. 25, 2015

Related U.S. Application Data

(60) Provisional application No. 61/866,044, filed on Aug. 15, 2013.

(51) Int. Cl.
*B64D 45/00* (2006.01)
*B64C 25/40* (2006.01)
(Continued)

(52) U.S. Cl.
CPC .............. *B64D 45/00* (2013.01); *B64C 25/405* (2013.01); *G01S 13/862* (2013.01); *G01S 13/865* (2013.01);
(Continued)

(58) Field of Classification Search
CPC .... B64D 45/00; B64C 25/405; G01S 13/862; G01S 13/865; G01S 13/867; G01S 13/93; G01S 15/93; G01S 17/98; G05D 1/0083; G08G 5/0021; G08G 5/04; G08G 5/06; G08G 5/065

See application file for complete search history.

(56) References Cited

U.S. PATENT DOCUMENTS 6,405,975 B1  6/2002  Sankrithi et al.
6,657,334 B1  12/2003  Edelson
(Continued)

FOREIGN PATENT DOCUMENTS

GB        2457144 A       8/2009
WO    2012109380 A2       8/2012

OTHER PUBLICATIONS

WingWatch: Aircraft Ground Collision Avoidance System, www.scss.tcd.ie.
(Continued)

*Primary Examiner* — Nicholas Kiswanto

(57) ABSTRACT

A method for monitoring an autonomous accelerated pushback process in an aircraft equipped with an engines-off taxi system is provided to maximize safety and facilitate the accelerated pushback process. The aircraft is equipped with a monitoring system including a number of different kinds of sensors and monitoring devices positioned to maximally monitor the aircraft's exterior ground environment and communicate the presence or absence of obstructions in the aircraft's path while the pilot is controlling the engines-off taxi system to drive the aircraft in reverse away from a terminal gate and then turn in place at a selected location before driving forward to a taxiway. The sensors and monitoring devices may be a combination of cameras, ultrasound, global positioning, radar, and LiDAR or LADAR devices, and proximity sensors located at varying heights adapted to continuously or intermittently scan or sweep the aircraft exterior and ground environment during aircraft ground movement.

11 Claims, 2 Drawing Sheets

(51) Int. Cl.
*G01S 15/93* (2006.01)
*G01S 17/93* (2006.01)
*G01S 13/86* (2006.01)
*G01S 13/93* (2006.01)
*G05D 1/00* (2006.01)
*G08G 5/00* (2006.01)
*G08G 5/06* (2006.01)
*G08G 5/04* (2006.01)

(52) U.S. Cl.
CPC ............... *G01S 13/867* (2013.01); *G01S 13/93* (2013.01); *G01S 15/93* (2013.01); *G01S 17/93* (2013.01); *G05D 1/0083* (2013.01); *G08G 5/0021* (2013.01); *G08G 5/04* (2013.01); *G08G 5/06* (2013.01); *G08G 5/065* (2013.01); *G08G 5/045* (2013.01); *Y02T 50/823* (2013.01)

(56) References Cited

U.S. PATENT DOCUMENTS

| | | | |
|---|---|---|---|
| 6,838,791 B2 | 1/2005 | Edelson | |
| 7,049,953 B2 | 5/2006 | Monroe | |
| 7,050,909 B2 * | 5/2006 | Nichols | G08G 5/0078 348/119 |
| 7,116,019 B2 | 10/2006 | Edelson | |
| 7,445,178 B2 * | 11/2008 | McCoskey | B64F 1/32 244/100 R |
| 7,469,858 B2 | 12/2008 | Edelson | |
| 7,891,609 B2 | 2/2011 | Cox | |
| 7,932,838 B2 * | 4/2011 | Hamza | G08G 5/06 340/507 |
| 7,975,960 B2 | 7/2011 | Cox | |
| 8,073,584 B2 * | 12/2011 | Marty | G08G 5/065 701/117 |
| 8,109,463 B2 | 2/2012 | Cox | |
| 9,033,273 B2 * | 5/2015 | Edelson | B64C 25/405 244/103 R |
| 2011/0233331 A1 * | 9/2011 | Frings | B64F 1/22 244/114 R |
| 2014/0142838 A1 * | 5/2014 | Durand | G05D 1/0083 701/301 |
| 2014/0330454 A1 * | 11/2014 | Purpura | B64D 45/00 701/3 |

OTHER PUBLICATIONS

Camera Systems, www.securaplane.com/products/camera-systems.
New York Times, "How an Autonomous Car Gets Around," www.nytimes.com/interactive/2012/10/28/automobiles/how-an-autonomous-car-gets-around.

* cited by examiner

METHOD FOR MONITORING AUTONOMOUS ACCELERATED AIRCRAFT PUSHBACK

PRIORITY CLAIM

This application claims priority from U.S. Provisional Patent Application No. 61/866,044, filed 15 Aug. 2013, the disclosure of which is fully incorporated herein by reference.

TECHNICAL FIELD

The present invention relates generally to monitoring the pushback of aircraft from a terminal gate or stand and specifically to a method for monitoring autonomous pushback in an aircraft equipped with an engines-off taxi system controllable for autonomous aircraft ground travel.

BACKGROUND OF THE INVENTION

Terminal gate and ramp areas in today's airports can be very congested places, with simultaneously arriving and departing aircraft and ground service vehicles and ground personnel servicing and directing aircraft into and out of gates. The avoidance of collision incidents in this area requires careful monitoring and control of the locations and movement of aircraft and other vehicles as they maneuver within these areas. The pushback of departing aircraft must be guided with even more care because the aircraft is moving in reverse, and the pilot and flight crew are not able to see the entire environment surrounding the aircraft. The sides and rear of the aircraft, in particular, cannot be seen by the pilot and crew from the cockpit. Currently, aircraft are pushed back with tow vehicles or tugs, and the tug driver is assisted by a number of ground personnel to guide and move the aircraft in reverse as it is simultaneously being turned to a location where the aircraft can start its engines and move forward to a taxiway. At many, if not most, airports, the environment surrounding the aircraft is monitored by these ground personnel and the tug driver, who communicate its status to the pilot through universal visual signals and, at some airports, through additional voice communications. Aircraft pushback, as it presently conducted, is a time and labor-intensive process that all too frequently produces delays in an airline's flight schedule.

Airport ground personnel are typically assigned to attach and detach tow vehicles and to monitor and direct reversing aircraft to ensure that no part of an aircraft structure will impact any fixed object or other aircraft or vehicle. These or other ground personnel may, in addition, communicate directly with the pilot or another aircraft cockpit crew member during the pushback process. The efficiency and speed with which pushback can be conducted depends on the availability of ground personnel as well as the availability of tow vehicles.

The efficiency and speed of aircraft pushback operations tends to be adversely affected by the ground congestion found in most large airports. Multiple airlines concurrently conduct both pushback and arrival operations for multiple aircraft. This strains not only the available towing equipment, but also the available ground personnel. Aircraft turnaround times may be increased significantly when tow bars, adapters, tugs, or ground crew personnel are not available for pushback when needed.

Driving an aircraft on the ground during taxi without reliance on operation of the aircraft's main engines or the use of tow vehicles has been proposed. For example, in commonly owned U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, aircraft drive systems that use electric drive motors to power aircraft wheels and move an aircraft on the ground without reliance on aircraft main engines or tow vehicles are described. A powered self pushback method and system in which aircraft are equipped with such drive systems is described in commonly owned International Patent Application Publication No. WO2012109380 A2. This powered self pushback method is designed for moving an aircraft parked in a nose-in orientation along a reverse path while simultaneously turning the aircraft in the same direction and along the same path as the aircraft would be pushed back with a tug. It is not suggested that an aircraft could travel in reverse along a path essentially perpendicular to a terminal or away from a gate without simultaneously turning, or that an aircraft could turn in a different direction so that the aircraft may taxi forward to a takeoff runway upon turning.

Sensors, including cameras and the like, have long been mounted on exterior locations on aircraft to monitor various aspects of an aircraft's exterior environment or an aircraft's ground maneuvers. In U.S. Pat. No. 6,405,975, for example, Sankrithi et al describe a camera system mounted to provide real time video images of the ground surrounding an aircraft nose or main landing gear to assist the aircraft pilot in maneuvering an aircraft with a wide wheel track, a long wheel base, or both during turns and gate entry. U.S. Pat. No. 7,049,953 to Monroe describes a plurality of strategically placed sensors, including video imaging generators, audio sensors, motion detectors, and smoke and fire detectors, primarily for remotely monitoring aircraft security, but also to monitor aircraft ground movement to avoid collisions when ground vehicles are outfitted with GPS receivers. Aircraft ground collision avoidance systems have also been described in the art. The WingWatch system, described at www.wingwatch.com, employs a system of cameras mounted on an aircraft that use computer vision techniques to provide a live, dynamic map of an aircraft's surroundings to detect obstacles that might pose a collision threat to an aircraft moving on the ground. A caution or warning indication in the form of acoustic cues and visual information is provided to the aircraft's pilot when an obstacle is detected. None of the foregoing art, however, suggests a method for monitoring a streamlined, accelerated pushback process or autonomous reverse ground travel in an aircraft equipped with an engines-off taxi system, wherein the aircraft is driven safely in reverse along an optimum path and turned at an angle that expedites pushback, so that it may then be driven forward for takeoff. A need exists for such a method.

SUMMARY OF THE INVENTION

It is a primary object of the present invention, therefore, to provide a method for monitoring a streamlined, accelerated pushback process and autonomous reverse ground travel in an aircraft equipped with an engines-off taxi system, wherein the aircraft is driven safely in reverse along an optimum path and turned at an angle that expedites pushback so that it may then be driven forward for takeoff.

It is another object of the present invention to provide a method for monitoring an accelerated pushback process in an aircraft equipped with an engines-off taxi system for autonomous ground movement wherein the engines-off taxi system is controlled by the aircraft pilot at pushback to drive the aircraft safely in reverse to a safe turning location, turned through a turning angle selected to expedite aircraft departure, and driven forward to a takeoff runway.

It is an additional object of the present invention to provide a method for monitoring an autonomous accelerated pushback process in an aircraft equipped with an engines-off taxi system controllable by a pilot of the aircraft, wherein a plurality of different kinds of sensors or monitoring devices are employed to communicate aircraft environmental information to a pilot to enable the pilot to control the engines-off taxi system to safely drive the aircraft in reverse out of a terminal gate.

It is a further object of the present invention to provide a method for monitoring an autonomous accelerated aircraft pushback process that enables a pilot of an aircraft equipped with an engines-off taxi system to safely maneuver the aircraft in reverse out of a gate area and then turn at an optimum angle and in an optimum direction with minimal assistance from ground personnel to taxi forward to a takeoff runway.

It is yet another object of the present invention to provide a method for monitoring an autonomous accelerated aircraft pushback process wherein a plurality of a range of different sensors or sensor devices continuously or intermittently scans or "sweeps" an exterior environment adjacent to an aircraft while the aircraft pilot is driving the aircraft in reverse away from a terminal gate and communicates a presence or absence of obstructions to the pilot in real time so that the pilot may control an engines-off taxi system to stop the aircraft's reverse travel if needed.

It is yet a further object of the present invention to provide a method for monitoring an autonomous accelerated aircraft pushback process wherein a plurality of different sensors or sensor devices obtains and communicates information relating to the presence or absence of objects or obstructions in an aircraft's exterior environment to a system controller with a capability to automatically stop ground movement of the aircraft in the event an object is present in the aircraft's pushback, turn, or travel path.

It is a still further object of the present invention to provide a method for monitoring an autonomous accelerated aircraft pushback process and autonomous aircraft reverse ground travel that employs a visual or non-visual aircraft-mounted monitoring or sensing device in combination with a ground or tarmac level visual or non-visual aircraft reverse travel path indicator to enable a pilot of the aircraft to control an engines-off taxi system to move the aircraft safely in reverse along an optimum reverse travel path.

In accordance with the aforesaid objects, the present invention provides a method for monitoring an accelerated pushback process in an aircraft equipped with an engines-off taxi system for autonomous ground movement to maximize safety during the accelerated pushback process while requiring minimal assistance from ground personnel. When an aircraft equipped with an engines-off taxi system that is parked in a nose-in position at an airport terminal or gate has been cleared for departure and pushback, a pilot of the aircraft may control operation of the engines-off taxi system to drive the aircraft in reverse. The aircraft follows a reverse path away from the terminal or gate for a selected distance, which may vary at different airports, where the aircraft may safely turn in place and drive forward to a taxiway or takeoff runway. A monitoring system is provided, preferably with a plurality of different types of sensors, sensor devices, and/or monitoring devices, which are adapted to monitor multiple levels of the aircraft's ground environment where potential obstructions may be located and to communicate to the pilot the presence or absence of obstructions in the aircraft's reverse travel path or turning radius. Such obstructions may range from a moving ground vehicle to a forgotten catering truck attached to the aircraft. The monitoring method of the present invention further minimizes or eliminates the assistance needed from ground personnel during an autonomous accelerated pushback and turning process. A ground or tarmac surface trailing line with visual or non-visual indicators that may be seen or sensed by appropriate monitoring or sensing devices on the aircraft may further be provided to assist the pilot in controlling the engines-off taxi system to guide the aircraft along an optimum reverse travel path.

Other objects and advantages will be apparent from the following description, drawings, and claims.

DESCRIPTION OF THE INVENTION

Figure 1A:
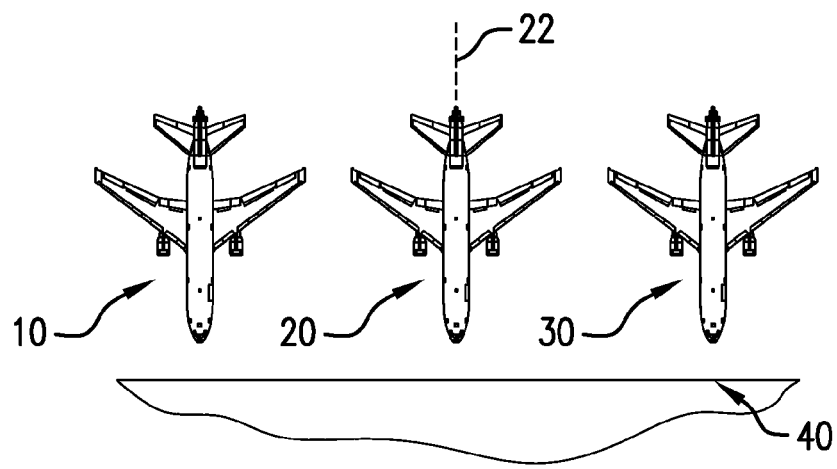
FIGS. 1A-1E illustrate the steps of an accelerated power push back process with which the monitoring method of the present invention is intended to be used to maximize safety and minimize assistance from ground personnel as a pilot of an aircraft controls an engines-off taxi system to move the aircraft safely in reverse during this accelerated pushback process.

Maximizing the efficiency of aircraft turnaround to reduce the time an aircraft spends on the ground continues to receive attention from airlines and airports in an effort to increase revenues in an era of increased operating costs. While specific estimates vary, it is generally agreed that even a minute saved during an aircraft's turnaround may produce substantial annual cost savings. Consequently, modifications to gate structures and turnaround procedures that achieve turnaround time reductions are of great interest to airport and airline operators. The inventors of the present method have developed an alternative to the currently used pushback process that realizes time and labor savings not previously possible while reducing aircraft turnaround time. This method may be quickly implemented, moreover, at an estimated 90% or more of all airports without requiring modifications to existing airport facilities.

In the most commonly used aircraft turnaround process, an aircraft is towed or powered by thrust from its main engine into a gate or other parking location to park in a nose-in orientation that is usually perpendicular to the gate or to an airport terminal. One or more, most commonly only one, passenger loading bridges are connected with aircraft doors, arriving passengers and baggage exit the aircraft, the aircraft is serviced, departing passengers board the aircraft, and loading bridges are moved back into place. When a tug is attached to the aircraft nose landing gear, an aircraft is cleared for pushback, and the tug pushes the aircraft in reverse away from the gate or terminal simultaneously as the aircraft is being turned to a location where the aircraft is parallel to the terminal. The tug is detached from the aircraft and, if the aircraft main engines have not already been started, they are started so that thrust from the engines may be used to drive the aircraft in a forward direction to a takeoff runway. Aircraft are oriented parallel to the terminal at this location to avoid jet blast from the operating engines hitting the terminal. Further, if aircraft are pushed back only partially and not into this parallel orientation by a tug, undesirable side loads may be produced on the aircraft nose landing gear by the tug.

The present monitoring method is intended to maximize pushback safety and minimize assistance from ground personnel when a streamlined, accelerated pushback method is employed to minimize turnaround time. An accelerated pushback method with which the present monitoring method may be used is described in co-pending application Ser. No. 14/337,229, filed 22 Jul. 2014, and entitled Method for Powered Accelerated Self Pushback of an Aircraft, the disclosure of which is fully incorporated herein by reference. The foregoing accelerated pushback method quickly and efficiently moves an aircraft in reverse from a nose-in parked location at a gate or terminal out of an obstructed apron area and then turns the aircraft in place, typically through a 180° turn, so the pilot can drive it forward to a takeoff runway. If local conditions at an airport permit it and departure of the aircraft will be expedited, the aircraft may be turned less than a full 180° turn. For example, without limitation, the aircraft may be turned 135°, if conditions warrant. Other turning angles may also be appropriate in specific situations, provided the turning aircraft does not enter an adjacent gate area. This streamlined, accelerated pushback method potentially saves at least one additional minute per pushback compared with the pushback of aircraft that are equipped with engines-off taxi systems and travel in reverse along a traditional pushback path where the aircraft simultaneously turns as it moves in reverse. Compared with current pushback procedures using tugs with or without tow bars, this streamlined pushback method may save at least 2-5 minutes of turnaround time.

The present method for monitoring autonomous accelerated powered pushback is designed to be used to monitor pushback in aircraft that are equipped with engines-off taxi systems for autonomous ground travel. Other systems of aircraft ground travel that do not employ aircraft engines to power aircraft ground movement, such as, for example, remotely controlled devices that may be attached to and detached from one of more aircraft wheels to move an aircraft during ground travel, are also contemplated to be within the scope of the present method. In a preferred engines-off taxi system, one or more non-engine drive means are mounted on one or more nose or main landing gear wheels to drive the wheels at a desired speed and torque. A most preferred engines-off taxi system has an electric drive motor that is mounted to drive each wheel in an aircraft nose landing gear and is powered by the aircraft auxiliary power unit. A high phase order electric motor of the type described in, for example, U.S. Pat. Nos. 6,657,334; 6,838,791; 7,116,019; and 7,469,858, all of which are owned in common with the present invention, is preferred for this purpose. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of motor capable of driving an aircraft on the ground, including hydraulic pump/motor assemblies, and pneumatic motors is also contemplated for use as a drive means in an engines-off taxi system used to move an aircraft during ground movement.

While an aircraft's pilot will have the primary control over the engines-off taxi system during the autonomous accelerated pushback process monitored as described herein, the monitoring system may be adapted so that an airport's Air Navigation Services and Ground Operations Control may also receive information and be capable of exerting some control over an aircraft's autonomous accelerated pushback.

Figure 1B:
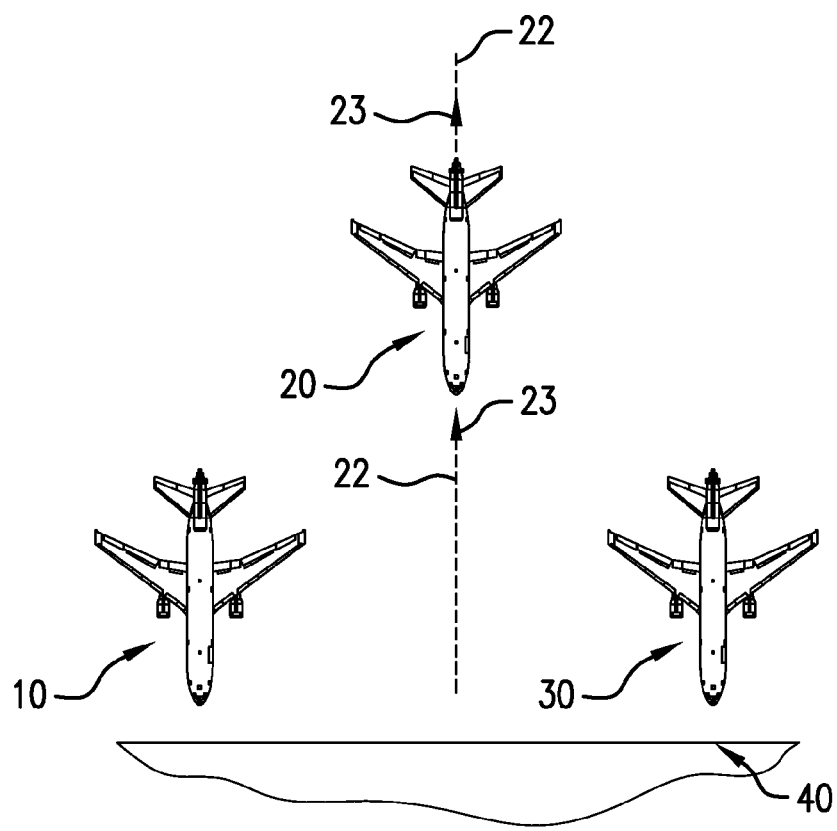

The present monitoring method is described with reference to the drawings, which are not necessarily drawn to scale. FIGS. 1A-1E show a preferred series of consecutive steps of a method for autonomous accelerated pushback in an aircraft equipped with an engines-off taxi system, as described above, that is controllable to drive an aircraft autonomously during ground travel and employs the monitoring method of the present invention. Referring to the drawings, FIG. 1A illustrates three aircraft 10, 20, and 30, parked at an airport terminal 40 in a typical nose-in orientation perpendicular to the terminal 40. Passenger loading bridges and other gate structures are not shown for clarity. Aircraft 20 is equipped with an engines-off taxi system as described above. When aircraft 20 has been cleared for departure and pushback, a pilot of aircraft 20 controls the aircraft's engines-off taxi system to drive the aircraft in a reverse direction straight back from the terminal 40, such as along the path represented by line 22, as shown in FIG. 1B. The pilot is essentially backing up the aircraft in much the same way the driver of an automobile may back up the automobile.

Figure 1C:
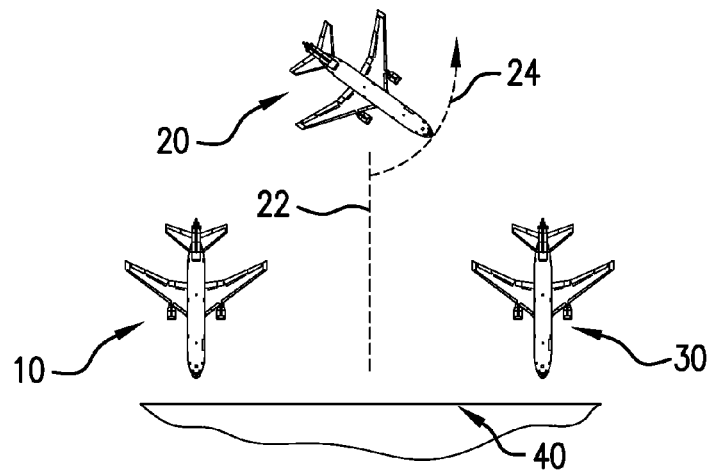

The pilot drives the aircraft in a reverse direction along the path designated by the line 22, as shown by arrow 23, to a location that is sufficiently far away from the gate so that there is space where the aircraft may be safely turned in place or pivoted without obstruction, as shown in FIG. 1C. The distance the aircraft is driven in reverse before it is turned or pivoted is preferably selected to allow the aircraft to move beyond congested gate and apron areas so that other aircraft, ground vehicles, and the like are less likely to be present in the area where the aircraft will be turning. This distance may vary, depending on a specific airport or even a specific gate or apron area. It may be necessary for an aircraft to reverse for about 20 to 50 meters to avoid encountering obstructions or entering an adjacent gate area prior to turning. At another airport, the distance traveled in reverse before a turn may be made safely may be greater or less than this range. The monitoring method of the present invention may be used to determine how far an aircraft must back up before a safe turn is possible.

At many airports, particularly where ramp and gate maneuvering space is restricted, long, straight leading lines may be painted on the ground surface or tarmac to guide pilots driving an aircraft in a forward direction along a designated path to a terminal upon arrival. Such lines should be clearly visible from the aircraft cockpit and enable an aircraft's pilot to guide the aircraft along the line to a gate or other parking location. Many airport gates are equipped with an automated docking system, which may also provide visual information for the pilot of an arriving aircraft to indicate the distance of the aircraft nose from a final parking position. When an aircraft is driven in reverse during pushback, as described herein, the pilot cannot safely use a leading line. The line 22, shown in FIGS. 1A-1E, may be used as a leading line when the aircraft is driven forward into the terminal 40 and as a trailing line in cooperation with the present monitoring system as described below when the aircraft is driven in reverse during autonomous pushback.

Figure 1D:
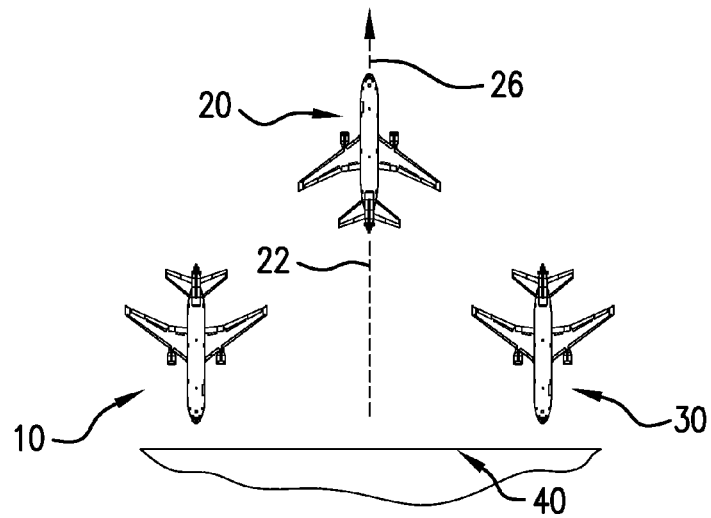
Figure 1E:
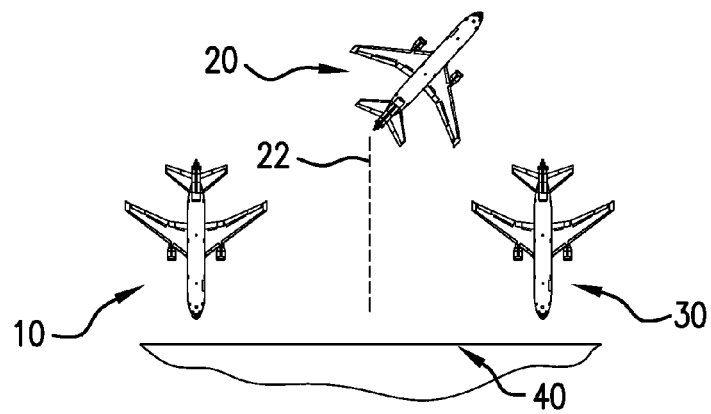

In FIG. 1C, aircraft 20 has reached a location where it is safe to turn. The pilot then stops the aircraft and controls the engines-off taxi system and may pivot or turn the aircraft in place a full 180° in the direction of the arrow 24, or in an opposite direction, so that the nose of the aircraft is pointing away from the terminal 40, as shown in FIG. 1D. The aircraft 20 may then be driven by the engines-off taxi system in a forward direction, such as along the path indicated by arrow 26 in FIG. 1D, to merge into ground traffic and then travel to a taxiway and/or a takeoff runway. The vast majority of airports currently have the space required for an aircraft rotation like this in uncongested apron or ramp areas. As a result, no airport modifications are required to implement this streamlined accelerated pushback method. The entire autonomous accelerated pushback process, from the time the aircraft is driven in reverse out of the gate until it is turned around to drive away in a forward direction may take about a minute or less.

Although the 180° turn shown and described may be most efficient, an aircraft may be turned less than 180° or greater than 180° from its perpendicular path before moving in a forward direction. For example, an aircraft may be turned about 90° from its perpendicular path in either direction to drive forward toward the left of the path or toward the right of the path. If, after turning 180°, an aircraft is not able to move forward along an extension of its original path 22 (FIG. 1*b*), the aircraft may continue to turn beyond 180°. As noted above, local airport conditions may allow a turn of less than the full 180°, so that a turn of about 135°, shown in FIG. 1E, or another suitable turning angle, may be all that is required before aircraft 20 may be driven forward to a takeoff runway to expedite its departure. The aircraft 20 must be able to turn at an angle different from 180° without entering an adjacent gate area.

When an aircraft equipped with an engines-off taxi system is backing up or traveling in reverse from the terminal 40 or a gate, as shown in FIG. 1B, a pilot may not have a clear view of the environment behind or surrounding the aircraft. Ground personnel may be used to ensure that the aircraft's path as it reverses is clear of obstacles or obstructions. However, although ground personnel, such as wing walkers, may be helpful in guiding an aircraft during conventional tug pushbacks involving simultaneous turning while reversing, they may lack experience guiding aircraft driven by engines-off taxi systems. To assist a pilot operating an aircraft with an engines-off taxi system to move in reverse along a path, such as trailing line 22, straight back from a gate and then to pivot in place, the present invention provides a method for monitoring this streamlined accelerated pushback process.

A preferred monitoring method should be able to monitor or survey a maximum portion of the aircraft's external ground environment where potential obstructions are likely to be found and to communicate information about ground environment conditions, including the presence or absence of obstructions, that may impact the safety of the aircraft so that the pilot may control the engines-off taxi system to appropriately control movement of the aircraft in response. A preferred monitoring method should, in addition, include a monitoring system with a range of different sensors, sensor devices, monitoring devices, and the like that are capable of obtaining and communicating information relating to an aircraft's surroundings during pushback in any visibility or environmental conditions. It is contemplated that sensor systems similar to those currently available for use in automobiles to enable them to back up safely may be adapted or combined with other sensors, sensor devices, and monitors in the monitoring system of the present invention.

For maximum effectiveness, it is preferred in the present method to monitor an aircraft's ground environment at different heights from the tarmac or a ground surface to ensure that a variety of different kinds of potential obstructions may be detected. In accordance with the present method, a plurality of different sensors, sensor devices, and/or monitoring devices may be employed to obtain a maximum amount of information. This enables the aircraft to be guided as safely as possible as it is driven by a pilot, first in a reverse direction away from a terminal or gate and then as the aircraft is pivoted or turned in place to be driven in a forward direction. It is preferred that the present monitoring method have the capability to scan or "sweep" an aircraft's exterior at all times during pushback. Monitoring may be continuous or it may be intermittent, depending in part on the most effective operation of a particular type of sensor or sensor device.

A range of different sensors or sensor devices may be used that are capable of scanning or sweeping an aircraft's exterior, either continuously, intermittently, or in an optimum combination of continuous and intermittent operation. A camera, for example, may operate continuously, while an ultrasound, radar or LiDAR system may be adapted to operate intermittently, as described in more detail below. This capability will enable the pilot to control operation of the engines-off taxi system to stop the aircraft at any time when detection of an obstruction is communicated to a system controller and to the cockpit while the aircraft is reversing or pivoting or, if warranted, to stop the pushback process.

The pushback process may be stopped or may not even be instituted if, for example, the present monitoring method is activated prior to the commencement of pushback and detects that a catering truck is still attached to the aircraft. That information would be communicated, such as through a system controller, to the cockpit through visual and/or audio signals as described below, and the pilot would know to refrain from operating the engines-off taxi system to drive the aircraft in reverse until removal of the catering truck from the aircraft was confirmed.

The communication of information relating to the aircraft's ground environment from sensors and/or sensor or monitoring devices to an aircraft cockpit and cockpit crew in accordance with the present method may be accomplished in any one of a number of ways. Visual and/or audio indicators, such as, for example without limitation, selectively colored flashing and/or non-flashing lights and/or selected sounds or tones may be used. A video display may further be employed to show, in real time, the exterior of the aircraft and/or a map of the aircraft's surroundings that may include relative locations and distances of other aircraft and ground vehicles that might pose obstructions or collision threats as the aircraft exterior is "swept" by selected sensors and/or monitoring devices. Other video displays and/or acoustic indicators are known in the art may be used and are contemplated to be within the scope of the present monitoring method.

It is preferred that a plurality of different types of sensors, sensor devices and/or monitoring devices be used in a monitoring system useful with the present monitoring method. Various kinds of sensors may be employed to provide different or overlapping information about potential hazards in an aircraft's external environment.

A monitoring system useful with the present monitoring method may, for example, include cameras located in positions on the exterior of an aircraft where a complete view all around the aircraft of the ground level environment at different heights above the ground may be obtained. It is preferred that at least one camera be mounted in the vicinity of the nose landing gear to communicate with the cockpit so that the pilot has a clear view of the aircraft's nose landing gear and the trailing line 22. A wide angle camera, for example, may be used to provide an optimal view of the area in front of and along the sides of the nose landing gear as the aircraft is driven in reverse to ensure that the nose wheels are following the trailing line 22. An expansive view of this area may also assist the pilot to stay on the line in the event that the nose wheel must be steered at a sharp angle. Suitable cameras for this purpose are available from, for example Securaplane Technologies Inc, and other sources. However, at night or in low visibility conditions, standard cameras by themselves may be of limited value in monitoring an aircraft's exterior during autonomous accelerated pushback as described herein.

Additional sensors, sensor devices, monitoring devices, and the like, both digital and analog, that are designed to provide information about objects in or near an aircraft's reverse or turning path are also contemplated for use in a monitoring system with the present monitoring method. These may include, for example without limitation, sonar or ultrasound, LiDAR or LADAR, global positioning (GPS), and/or radar systems, similar to those currently used for enhanced environmental monitoring in automobiles, but specifically adapted for aircraft use. Proximity sensors, which may be attached to locations at the extremities of an aircraft, for example the wing tips, tail, nose, as well as to other aircraft exterior locations may also be used to monitor potential obstructions. The use of a range of different types of sensors, sensor devices, and monitoring devices, rather than relying on a single type of sensor, sensor device, or monitoring device, ensures that a maximum portion of an aircraft's exterior environment will be monitored in all visibility and weather conditions. When the effectiveness of one type of sensor or sensor device is limited as a result of environmental conditions, other sensors or sensor devices are available to monitor an aircraft's exterior and communicate the presence or absence of obstructions in the aircraft's travel path to the cockpit.

It is noted that the term LiDAR, which refers to a light detection and ranging device, is frequently used also to include LADAR, which refers to a Laser Detection and Ranging device. Both acronyms represent remote sensing technology capable of determining the distance between a sensor and an object, in the instant invention the distance between a sensor located on an aircraft and a potential obstruction as the aircraft is driven in reverse during pushback. A highly detailed three-dimensional map of a potential obstruction may be produced by either LiDAR or LADAR, and both may be used as sensor devices to communicate such a map as a visual display to an aircraft cockpit in accordance with the present monitoring method.

Sensors, sensor devices and monitoring devices useful with the present monitoring method may be removably or permanently attached to or embedded in exterior aircraft structures at locations selected to maximize the extent of environmental information obtained during aircraft ground travel, particularly during the accelerated pushback process described herein. These various sensor and sensor devices should preferably be capable of checking for obstructions at a range of heights above a ground surface relative to an aircraft for maximum opportunity to detect structures and/or objects that might interfere with or obstruct aircraft movement. In accordance with the present method, the foregoing sensors or sensor devices may be adapted to continuously monitor an aircraft's exterior environment prior to pushback and during pushback as the aircraft reverses and turns. Alternatively, these sensors and sensor devices may be adapted to intermittently monitor the aircraft exterior environment. Radar and LiDAR or LADAR systems, for example, may be programmed to release, respectively, a burst of microwave or laser energy at random or at selected intervals to detect potential obstructions in an aircraft's reverse pushback or turn path.

When a combination of different sensor devices is used to monitor and obtain information about an aircraft's external ground environment as described herein, limitations of one particular type of sensor device may be compensated for by a different type of sensor device. As noted above, cameras are minimally effective in low visibility conditions. Ultrasound sensor devices may also be affected by atmospheric temperature and pressure. The additional use of a radar or LiDAR or LADAR sensor device or proximity sensors, for example, allows the detection of objects near an aircraft when visibility is low or weather conditions interfere with the transmission of sound waves. In an additional example, when the aircraft pilot is preparing the engines-off taxi system for reverse movement or is driving the aircraft in reverse, "bursting" by a radar system could check for potential obstructions not necessarily visible to a camera under low visibility conditions or at other times. One or more LiDAR or LADAR devices may be adapted and positioned to scan or "sweep" the sides and rear of an aircraft at different heights or levels above the ground as described above and provide a map of the aircraft's surroundings. Different types of sensors or sensor devices may additionally be positioned in different aircraft exterior locations and/or at different heights above the ground surface to maximize the extent of the exterior space around the aircraft that is being monitored.

It is further contemplated that a cooperative arrangement of non-visual sensing devices may be provided on the airport ground surface or tarmac and on the aircraft. The trailing line 22, for example, may, instead of a conventional painted line, be a linear array of indicators positioned to define an optimum aircraft reverse travel path. The linear array of indicators may also be used to guide aircraft forward travel into the terminal. One or more sensors designed to detect the ground surface indicators may be mounted on the aircraft in locations where the positions of such indicators may be detected as the aircraft is driven in reverse by the pilot-controlled engines-off taxi system. A cockpit indicator, such as, for example, an audible or visual signal, may be provided to warn the pilot in the event that the aircraft strays from the travel path so that the pilot may take appropriate action to return the aircraft to the trailing line 22. Other arrangements of cooperative non-visual ground level indicators and aircraft-mounted sensors may also be employed to ensure that an aircraft travels in reverse along an optimum path in an autonomous accelerated pushback process as described herein.

The automated gate docking systems currently available at many airports and used to signal the arrival of an aircraft may additionally be used to monitor movement of an aircraft in reverse by a pilot-controlled engines-off taxi system during the autonomous accelerated pushback process described herein. These automated systems may be modified, if required, to provide information to the pilot about the aircraft's distance from a gate as the aircraft is reversed, as well as information about the aircraft's position where a turn may be started.

It is additionally contemplated that appropriate software may be adapted to integrate information from a range of different types of sensors or sensor devices to provide continuous real time information to a system controller and to an aircraft pilot before and during autonomous accelerated pushback in a video display or in another form as described above.

The present monitoring method is intended to facilitate and maximize safety as an aircraft equipped with an engines-off taxi system autonomously pushes back from an airport terminal or gate using the streamlined accelerated pushback process described above. The aircraft is additionally equipped with a monitoring system that preferably includes a plurality of different types of sensors and/or sensor devices positioned on the aircraft exterior in locations selected to monitor a maximum amount of the ground environment and space surrounding the aircraft. The monitoring system is further designed to inform the pilot when obstructions are detected that would prevent the aircraft from reversing and turning safely. When the aircraft has been cleared for pushback, the pilot ensures that the monitoring system is functioning and activates and controls the engines-off taxi system to drive the aircraft in reverse so that the aircraft may back up or reverse from a terminal or gate, such as along the path represented by line 22, to a location where it may pivot safely and then drive forward away from the gate. The monitoring system operates continuously or intermittently while the pilot is driving the aircraft in reverse and then turning to scan and/or "sweep" the area around the aircraft and communicates to the cockpit the presence of objects detected in the aircraft's reverse travel path. The monitoring system may additionally visually or non-visually monitor the reverse travel of the aircraft along the trailing line 22 as described above. The pilot can control operation of the engines-off taxi system to keep the aircraft on an optimum reverse travel path or to stop or slow the aircraft, as appropriate.

The monitoring system of the present invention may also be adapted to bypass pilot control of the engines-off taxi system and stop movement of the aircraft if, for example, a pilot has not responded to an obstruction indication communicated to a system controller and/or to the cockpit, and the monitoring system senses that collision is imminent. In the event that a sensor senses an obstruction that is too close to the aircraft, that information may be communicated to a monitoring system controller, which may be designed to interact directly with the aircraft engines-off taxi system to automatically prevent the taxi system from moving the aircraft. If the aircraft is already moving when one or more sensors senses an obstruction or a potential for collision, the monitoring system controller may be designed with the capability to stop the engines-off taxi system, apply the aircraft's brakes, or take whatever action is needed to stop the aircraft from moving. It is also contemplated that information relating to such an obstruction or potential for collision may be sent to Air Navigation Services and Ground Operations Control at an airport to provide a record of the event if an investigation is required. The foregoing example is merely illustrative, and it is contemplated that a range of monitoring systems and/or system controllers may be useful with the present monitoring method to monitor an aircraft's exterior ground environment during an autonomous accelerated aircraft pushback process and to provide information and feedback to a pilot of the aircraft so that the safety of the pushback process is maximized.

While the present invention has been described with respect to preferred embodiments, this is not intended to be limiting, and other arrangements and structures that perform the required functions are contemplated to be within the scope of the present invention.

Industrial Applicability

The method for monitoring autonomous aircraft pushback of the present invention will find its primary applicability in facilitating and ensuring safe and efficient pushback in an aircraft equipped with an engines-off taxi system controllable by a pilot of an aircraft to drive the aircraft in a reverse path away from a terminal or gate and then pivot in place during a streamlined, accelerated pushback process before driving forward to a taxiway or takeoff runway.

The invention claimed is:

1. A method for maximizing safety and time savings during pushback in aircraft equipped with an engines-off taxi system for autonomous ground travel without reliance on operation of the aircraft main engines or tow vehicles, comprising:
   a. in an aircraft equipped with a pilot controllable engines-off taxi system operable to drive the aircraft autonomously, providing a monitoring system comprising a plurality of different kinds of monitors, sensors, and sensor devices positioned in multiple locations on an exterior of the aircraft and at multiple heights above an airport ground surface selected to obtain information relating to the aircraft ground environment and space surrounding the aircraft's exterior during pushback;
   b. controlling the engines-off taxi system during pushback to drive the aircraft in a reverse direction along a defined pushback travel path away from an airport terminal wherein the aircraft is positioned in a nose-in orientation with a longest axis of the aircraft perpendicular to the airport terminal as the aircraft is moved in the reverse direction along the defined pushback travel path to a turning location, turning the aircraft in place at the turning location through an angle of about 180 degrees so that the aircraft is positioned in a nose-out orientation with a longest axis of the aircraft perpendicular to the airport terminal, and driving the aircraft in the nose-out orientation in a forward direction away from the airport terminal to a taxiway or takeoff runway;
   c. while the engines-off taxi system is controlled to drive the aircraft in reverse along the defined pushback travel path, turn the aircraft in place at the turning location, and then drive the aircraft forward, activating the monitoring system so that said plurality of monitors, sensors, and sensor devices continuously or intermittently sweep the aircraft ground environment and aircraft exterior surface and space to obtain and integrate real time information from the plurality of monitors, sensors, and sensor devices relating to the aircraft exterior environment in the defined pushback travel path and communicating the integrated information to the pilot; and
   d. in response to the communicated real time information, further controlling the engines-off taxi system to continue the pushback process without interruption and then drive the aircraft to a taxiway or to stop the aircraft when the communicated real time information indicates that the pushback process cannot be continued safely.

2. The method of claim 1, further comprising when said plurality of monitors, sensors, and sensor devices communicates the presence of an obstruction in or near the defined pushback travel path to the pilot, controlling the engines-off taxi system to stop the aircraft from moving in reverse along the defined pushback travel path.

3. The method of claim 1, further comprising communicating a presence or absence of an obstruction in said pushback travel path to a cockpit of said aircraft by one or more indicators comprising a video display, flashing or steady lights, or an audio signal to alert the pilot and controlling the engines-off taxi system to stop said aircraft or to continue to drive said aircraft in response to the presence or absence of an obstruction as communicated by said one or more indicators.

4. The method of claim 3, further comprising communicating the presence of an obstruction in or near the defined pushback travel path to the pilot of the aircraft and to Air Navigation Services and Ground Operations Control at the airport.

5. The method of claim 3, further comprising, when said plurality of monitors, sensors, and sensor devices communicates the presence of an obstruction to the pilot through said one or more indicators and the pilot fails to control the engines-off taxi system to stop the aircraft from moving, inactivating said engines-off taxi system to stop said aircraft.

6. The method of claim 3, further comprising adapting the monitoring system to bypass pilot control of the engines-off taxi system and stop movement of the aircraft if the pilot has not responded to an obstruction indication communicated to the cockpit when the monitoring system senses that collision is imminent, and automatically controlling the engines-off taxi system to stop movement of the aircraft.

7. The method of claim 1, further comprising locating said plurality of monitors, sensors, and sensor devices at said multiple locations and heights in positions on said aircraft exterior selected to produce and communicate a real time video display of said aircraft exterior environment to said pilot.

8. The method of claim 1, further comprising providing one or more visual or non-visual ground surface indicators corresponding to the defined pushback travel path and providing cooperating visual or non-visual sensors or sensor devices on said aircraft to assist the pilot in driving the aircraft safely in reverse along the defined pushback travel path.

9. The method of claim 1, further comprising providing a plurality of different monitors, sensors, and sensor devices operable to scan exterior areas of said aircraft not visible to the pilot to provide maximal real time information about the aircraft's ground environment comprising a plurality of cameras, GPS devices, ultrasound devices, radar devices, LiDAR or LADAR devices, and proximity sensors.

10. The method of claim 1, further comprising defining a pushback travel path distance and selecting the turning location at the defined pushback travel path distance at an airport location where the aircraft may be safely turned in place or pivoted without obstruction.

11. The method of claim 1, further comprising providing a monitoring system controller in interactive communication with the engines-off taxi system and, when the pilot has not responded to the presence of an obstruction in or near the defined taxi path communicated by the monitoring system, automatically preventing the engines-off taxi system from moving the aircraft.

\* \* \* \* \*